US008935317B2

(12) United States Patent
Jain

(10) Patent No.: US 8,935,317 B2
(45) Date of Patent: Jan. 13, 2015

(54) DYNAMIC PARTITIONING OF APPLICATIONS BETWEEN CLIENTS AND SERVERS

(75) Inventor: Navendu Jain, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 301 days.

(21) Appl. No.: 12/821,161

(22) Filed: Jun. 23, 2010

(65) Prior Publication Data
US 2011/0320520 A1    Dec. 29, 2011

(51) Int. Cl.
G06F 15/16    (2006.01)
G06F 9/50    (2006.01)

(52) U.S. Cl.
CPC .......... G06F 9/5072 (2013.01); G06F 9/5094 (2013.01)
USPC .............. 709/203; 709/224; 709/226; 718/1

(58) Field of Classification Search
CPC ..... G06F 9/505; G06F 9/5044; G06F 9/5061; G06F 9/5077; G06F 9/5066; G06F 9/5072; G06F 9/5088; G06F 9/5094; H04L 67/04; H04L 67/1012; H04L 67/1008
USPC ................ 709/203, 223, 224, 226; 718/1
See application file for complete search history.

(56) References Cited

U.S. PATENT DOCUMENTS

| 5,457,797 | A  | * | 10/1995 | Butterworth et al. ......... 719/320 |
|---|---|---|---|---|
| 5,805,804 | A  |   | 9/1998  | Laursen et al. |
| 6,983,463 | B1 |   | 1/2006  | Hunt |
| 7,437,707 | B2 |   | 10/2008 | Huerta et al. |
| 2005/0111375 | A1 | * | 5/2005 | Ravindran et al. ............ 370/252 |
| 2006/0123217 | A1 | * | 6/2006 | Burdick et al. ................ 711/173 |
| 2006/0218261 | A1 | * | 9/2006 | Shen et al. ..................... 709/223 |
| 2007/0079297 | A1 | * | 4/2007 | Wezelenburg et al. ....... 717/140 |
| 2008/0140690 | A1 |   | 6/2008 | Cuomo et al. |
| 2008/0307048 | A1 | * | 12/2008 | Friedler et al. ............... 709/203 |
| 2008/0313549 | A1 |   | 12/2008 | Stoyanov et al. |
| 2009/0204964 | A1 | * | 8/2009 | Foley et al. ....................... 718/1 |
| 2009/0313319 | A1 | * | 12/2009 | Beisiegel et al. ............. 709/203 |
| 2010/0077024 | A1 | * | 3/2010 | Yun .............................. 709/203 |
| 2011/0119364 | A1 | * | 5/2011 | Zarkesh ........................ 709/223 |
| 2011/0282982 | A1 | * | 11/2011 | Jain .............................. 709/223 |
| 2012/0120098 | A9 | * | 5/2012 | Faulkner et al. .............. 345/619 |

OTHER PUBLICATIONS

Chun, et al., "Augmented Smartphone Applications through Clone Cloud Execution", Retrieved at << http://www2.berkeley.intel-research.net/maniatis/publications/2009HotOSCloneCloud.pdf >>, in USENIX HotOS XII, 2009.

(Continued)

Primary Examiner — Oanh Duong
(74) Attorney, Agent, or Firm — Kusnyer Ladislav; David Andrews; Micky Minhas

(57) ABSTRACT

Optimization mechanism that dynamically splits the computation in an application (e.g., cloud), that is, which parts run on a client (e.g., mobile) and which parts run on servers in a datacenter. This optimization can be based on application characteristics, network connectivity (e.g., latency, bandwidth, etc.) between the client and the datacenter, power or energy available at the client, size of the application objects, load in the datacenter, security and privacy concerns (e.g., cannot share all data on the client with the datacenter), and other criteria, as desired.

28 Claims, 11 Drawing Sheets

(56) References Cited

OTHER PUBLICATIONS

Kunz, et al., "An Architecture for Adaptive Mobile Applications", Retrieved at << http://citeseerx.ist.psu.edu/viewdoc/download?doi=10.1.1.40.624&rep=repl&type=pdf >>, Proceedings of Wireless 99, the 11th International Conference on Wireless Communications, 1999.

Asif, et al., "Application Partitioning for Enhancing System Performance for Services Hosted on Wireless Devices", Retrieved at << http://citeseerx.ist.psu.edu/viewdoc/download?doi=10.1.1.105.964&rep=rep1&type=pdf >>, 2008.

* cited by examiner

DYNAMIC PARTITIONING OF APPLICATIONS BETWEEN CLIENTS AND SERVERS

BACKGROUND

The number and types of network devices are growing rapidly. Consequently, there are widely varying capabilities of connected devices—ranging from high-end gaming computers (with powerful processors, graphics processing capabilities, and fast network connections), through laptops and netbooks, to smartphones and feature phones with lower levels of functionality, energy reserves, and performance. Consequently, such a diverse set of ever-evolving devices makes it difficult for software developers to design software for relatively consistent performance and user experience. Developers are then limited to targeting software to a broad spectrum of devices without providing an product that can address and exploit the features and capabilities of the various device types while maintain a satisfying user experience.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture is an optimization mechanism that dynamically splits the computation in an application (e.g., cloud), that is, which parts run on a client (e.g., mobile device), and which parts run on servers in a datacenter. The application can now be agnostic as to completion of the workload task with respect to where computations are performed. Moreover, developers no longer need to specially program this flexibility into the client application.

This optimization can be based on several factors such as application characteristics, network connectivity (e.g., latency, bandwidth, etc.) between the client, network edge, and the datacenter, power or energy available at the client, size of the application objects, data dependencies, load in the datacenter, security and privacy concerns (e.g., cannot share all data on the client with the datacenter), desired end-to-end response time or throughput, computation, memory, storage, and communication characteristics of client devices, middle (intermediary) devices, and servers in the datacenter, and other criteria, as desired.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
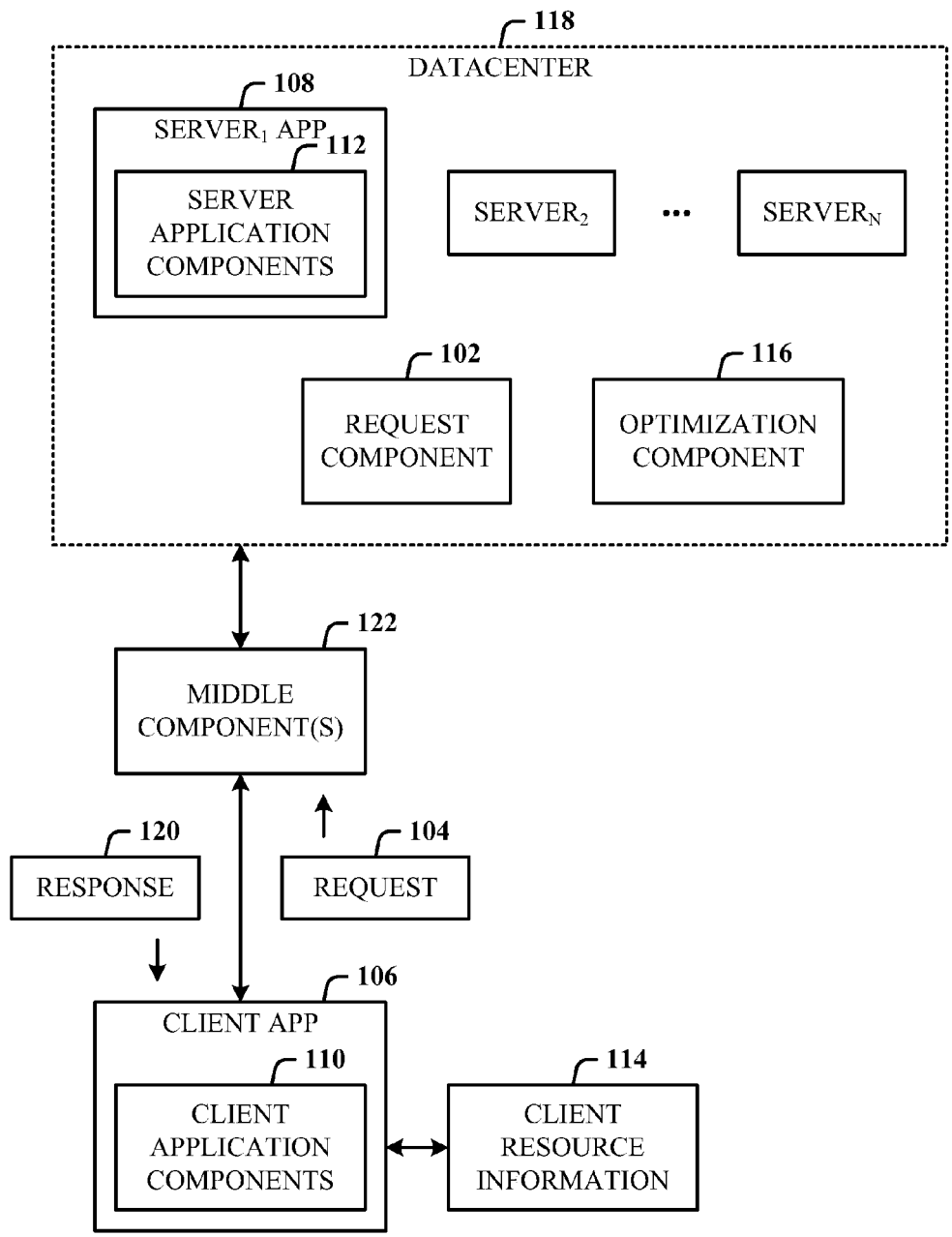
FIG. 1 illustrates a computer-implemented optimization system in accordance with the disclosed architecture.

The disclosed architecture is an optimization framework that dynamically partitions a cloud application between a client (e.g., mobile device), and a server (e.g., hosted in a datacenter). Generally, an application model is defined that considers criteria such as computation cost associated with a client, computation cost for a datacenter server, and memory footprint cost incurred during execution, and bandwidth capacity cost, data dependencies, and object size cost, for example. Metrics are monitored and employed to perform the optimization. Moreover, the optimization framework can be integrated with executing applications.

Given the differing device capabilities, an application can now adapt to the runtime environment to optimize performance and user experience. This description discusses the potential of cloud applications dynamically adapting to the connected-device environment by adjusting which computation of the application runs on the client device, which parts run on the middle (or intermediary) server, and which parts run in the datacenter. As indicated above, the description will refer periodically to the facial-recognition cloud application and an optimization framework where the dynamic client-server partitioning decision is made. The optimization framework minimizes the effect on end-to-end performance while extending battery consumption on mobile clients, for example. In the facial-recognition example, a user records a multimedia object (e.g., image, video, voice) of a subject of interest (e.g., a human face) using a mobile device. The cloud application is split into three pieces: picture capture (pinned to client), feature extraction (movable tier), and image matching (pinned to datacenter). It is possible that the applications can be split even further.

The cloud application extracts a feature vector representing the image (or video), matches the extracted feature set with a profile database, and returns a bio-synopsis of the original subject in form of text, speech, image or video back to the user. Any one or more of these processes can be resource intensive. Thus, based on the client device used and associated hardware and software capabilities (and hence, resources) a problem is to determine the optimal partitioning of the cloud application so that components of the application can be split between the client and one or more servers of the datacenter in an optimized way.

A goal of dynamic application partitioning is to enable energy-aware offloading/remote execution of applications running on mobile devices to resource-rich cloud infrastructures. Prior approaches rely on programmer-defined or manual static partitions or on coarse-grained partitioning resulting in migration of full applications. The decision-making unit is a closed-loop control system with an optimization algorithm at its core; the controller decides what code runs where for each client request while leveraging dynamic instrumentation of the client and the datacenter.

Although description periodically herein with respect to the application being related to facial-recognition, other application such as for conference speech translators, video indexing, and the meeting assistants, for example, are also applicable. Other application models suited to dynamic application partitioning include virtual mapping programs (the client caches a detailed view of local map information including places of interest, directions, etc., whereas the cloud hosts richer information about the entire geo-graphical location), SQL database applications (clients collaborate to perform query optimization, leverage index caches, re-use cached results, etc.), online gaming (e.g., maintaining a consistent view of players' health in a multi-player shooting game), and spreadsheet applications (each client performs computations on local data and sends summary results to the cloud which aggregates these results across all clients to compute global results and sends them back to the clients).

A high-level overview of the algorithm for dynamic application partitioning between a client and datacenter location is as follows. The problem is modeled according to the system model described below and obtains the current values of the different parameters in the framework, either offline or in an online manner as needed. These values (the client-specific parameters are received in an application request packet received from the client) are fed into the optimization framework, running on a central controller machine on the middle server or in the datacenter, for example, which solves the optimization problem to compute the optimal placement of application components (assigned to either the client, middle server, or a server hosted in the datacenter). On receiving a client request, these decisions are then actuated by sending a response message to the client to compute locally its assignment of application components (the execution code for corresponding components can be pushed to the client or the client can use cached executable code from past executions or get it installed locally a priori) and send the computed data for further processing to the datacenter.

Note that the above algorithm can complement current closed-loop control frameworks for managing pools of resources (e.g., servers) in a datacenter. Given a large number of servers hosting cloud applications in a datacenter, the algorithm can be applied to frameworks that attempt to maximize the energy savings of operating these computers by only running the optimal number of servers needed to process the input workload under given service level agreement (SLAs), while keeping remaining servers in low-power states (e.g., ACPI (advanced configuration and power interface) states such as sleep, hibernate) or shutdown mode to save energy. In this implementation the optimization framework can incorporate estimated availability and utilization of servers in the cloud to offload computational load on to the clients.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented optimization system 100 in accordance with the disclosed architecture. A request component 102 receives a request 104 from a client application 106 of a client device to process client workload via a related server application 108. The client application 106 and server application 108 include components (e.g., client application components 110 and server application components 112) for processing the workload. The request 104 can include client resource information 114 of available client resources to process the workload. An optimization component 116 determines an optimal partitioning of the components (client application components 110 and server application components 112) to process the client workload based on the client resource information 114, among other factors.

The server application 108 can be one of multiple servers of a datacenter 118 to which the workload can be assigned and/or distributed. The client application 106 can be a cloud application where shared resources, information and software are provided to interacting clients on demand.

The optimal partitioning can be based on energy consumption of the client device, resource footprint of the client device, data dependencies, network connectivity, and/or service level agreement, application characteristics, power or energy available at the client, size of the application objects, load in the datacenter, security and privacy concerns (e.g., cannot share all data on the client with the datacenter), computation, memory, storage, and communication characteristics of client devices, middle devices (systems), and servers in the datacenter, among other factors. The optimal partitioning can also be performed on a per-request basis. The optimization component 116 sends a response 120 to the client application 106 that defines which client components 110 to run locally against the workload.

As illustrated, the system 100 can, optionally, include a middle (or intermediary) component(s) 122, that reside on a network edge (e.g., the Internet) for the benefit of the client application 106, and/or for the datacenter 118.

The client application 106 can be modeled as a directed data flow graph of vertices as processing modules and edges as communication links. The graph has associated costs where each vertex has an associated computation cost, storage cost, and memory footprint cost, and each edge has an associated bandwidth capacity cost and object size cost. The costs can be measured offline using profiling and/or learned online during execution of the client application 106 and/or the server application 108.

The optimal partitioning can be based on computation and storage costs of components running on the client device, memory footprint to run components on the client device, bandwidth needed based on the partitioning, power usage by the client device, end-to-end latency as a function of compute time and transmission latency, conservation of minimum battery life of client, and/or datacenter utilization where the server is sited, among other factors. The optimization component 116 can push one or more components to the client device to run against the workload.

Figure 2:
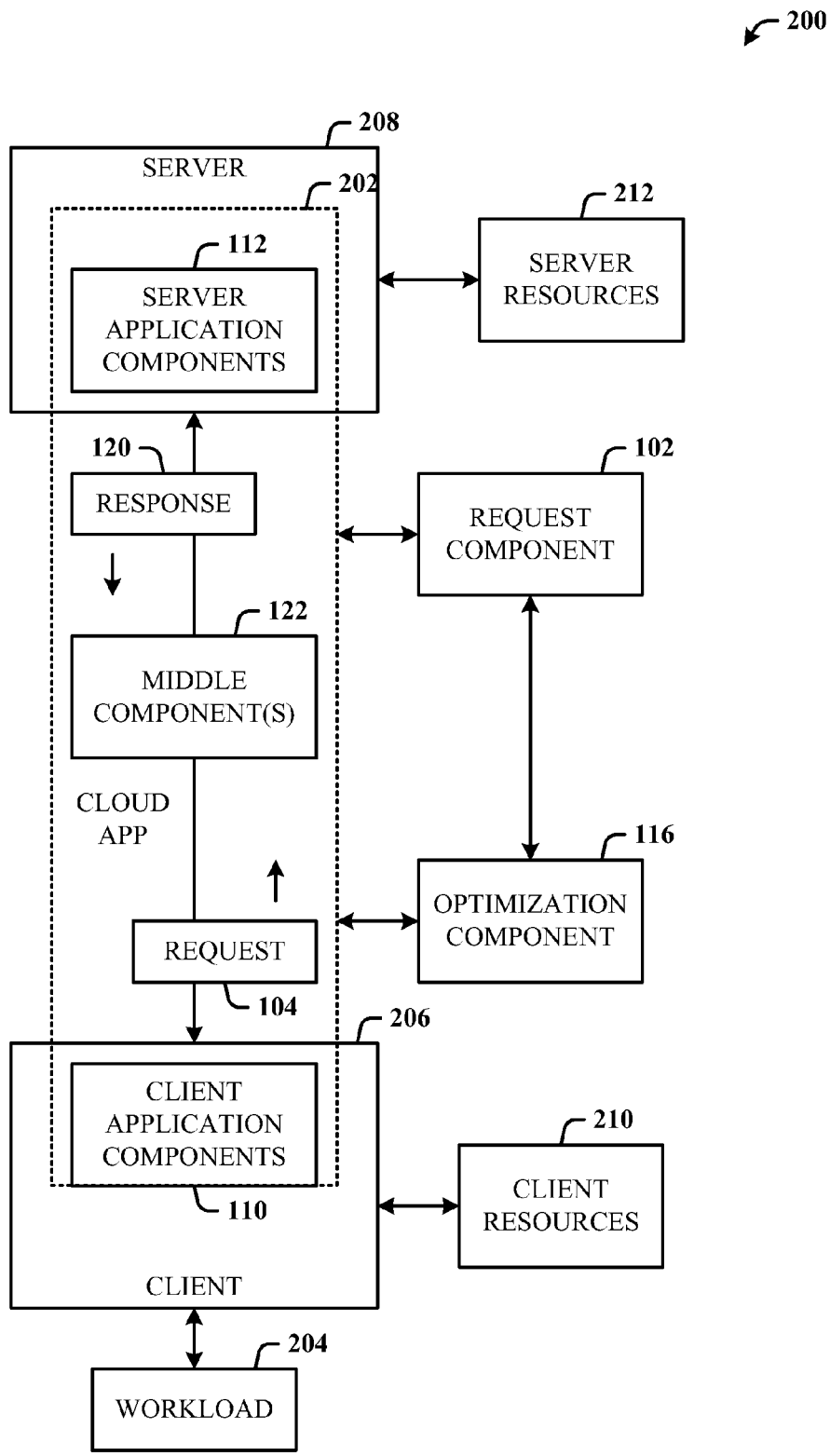
FIG. 2 illustrates an alternative representation of an optimization system.

FIG. 2 illustrates an alternative representation of an optimization system 200. The system 200 includes the request component 102 that receives the request 104 from a cloud application 202 to process workload 204. The cloud application 202 comprises the client components 110 of a client 206 (e.g., the client application 106) and server components 112 of a server 208 (e.g., the server application 108) for processing the workload 204. The optimization component 116 determines the optimal partitioning of the client components 110 and server components 112 in the cloud application 202 to process the workload 204 based on client resources 210 and server resources 212. The optimization component 116 sends the response 120 to the client 206, which response 120 defines which of the client components 110 to run locally against the workload 204.

The optimal partitioning can be based on energy consumption of the client, resource footprint of the client, network connectivity, and/or a service level agreement, etc. The optimal partitioning can be based on computation costs of components running on the client device, memory footprint to run components on the client device (e.g., a mobile device), bandwidth needed based on the partitioning, power usage by the client device, end-to-end latency as a function of compute time and transmission latency, conservation of minimum battery life of the client, and/or datacenter utilization where the server 208 is sited, among other factors.

The cloud application 202 can be modeled to include a computation cost associated with processor resources of the client 206, a computation cost associated with processor resources of the server 208, a memory footprint cost incurred during execution, a bandwidth capacity cost between the client 206 and the server 208, and/or an object size cost of data transferred between the client 206 and the server 208 during computations.

Figure 3:
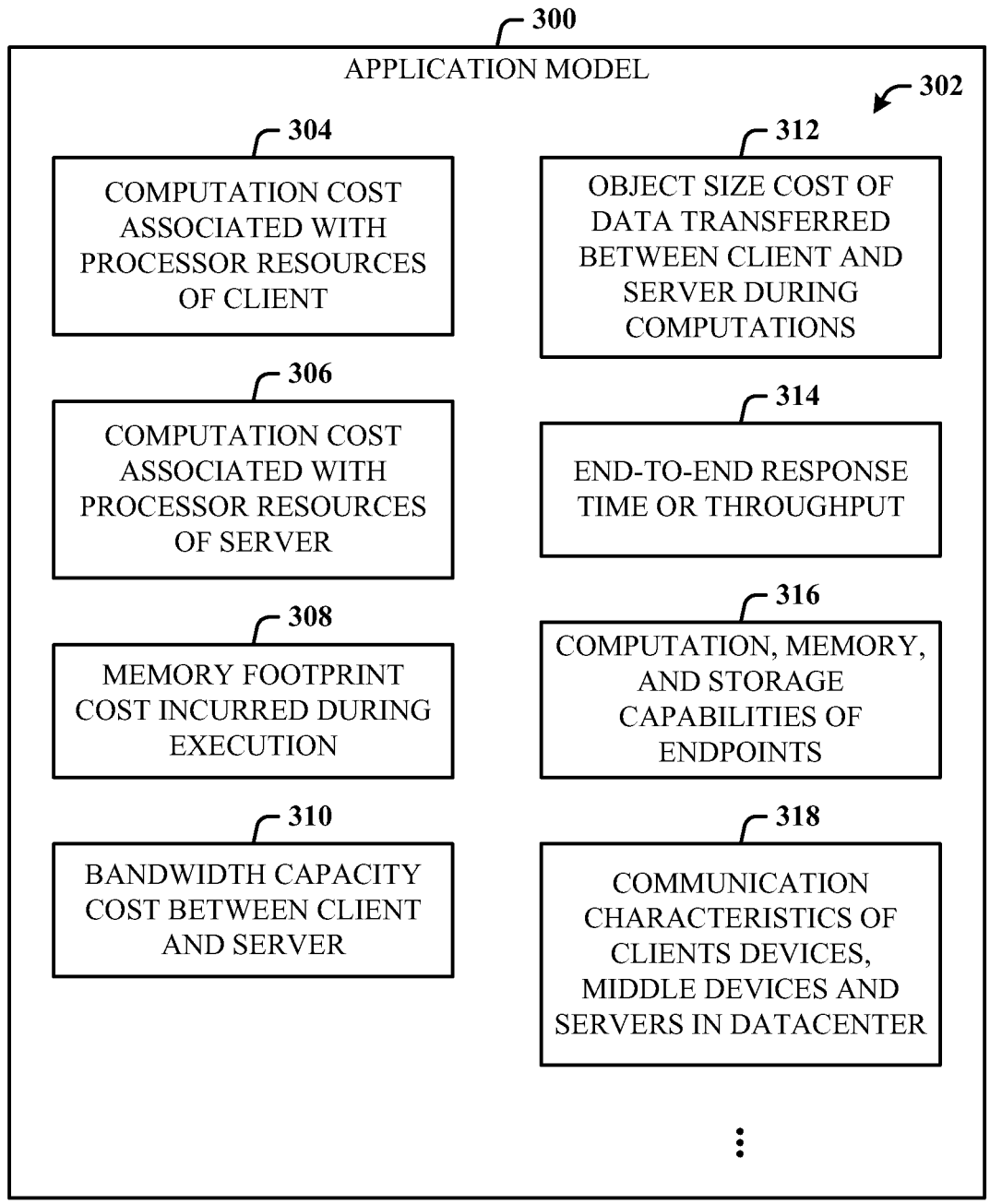
FIG. 3 illustrates an exemplary application model that models costs associated with the cloud application.

FIG. 3 illustrates an exemplary application model 300 that models costs 302 associated with the cloud application. The model 300 can consider a computation cost 304 associated with processor resources of the client, a computation cost 306 associated with processor resources of the server, a memory footprint cost 308 incurred during execution, a bandwidth capacity cost 310 between the client and the server, and/or an object size cost 312 of data transferred between the client and the server during computations. Other costs can be associated with desired end-to-end response time or throughput 314, computation, memory, and storage capabilities of the endpoints 316, and communication characteristics of client devices, middle devices, and servers in the datacenter 318, for example. The costs 302 can be measured offline using profiling and/or learned online during execution of the client and the server.

Following is a detailed description of the application model 300 and problem formulation as an optimal partitioning of the data flow graph.

The application (e.g., cloud) can be model as a directed data flow graph G(V, E) where vertices are processing modules and edges are directed communication links. Each vertex v∈V in the graph has a computation cost $$c_v\left(\frac{1}{c_v}\right)$$

denotes the execution time of application component ϵ on the client in seconds) (expressed in frequency (e.g., Hertz) or a fraction of processor cycles of the client processor), a computation cost $$d_v\left(\frac{1}{d_v}\right)$$

denotes the execution time of application component v on the server in seconds) (expressed in frequency (e.g., Hertz) or fraction of processor cycles of the datacenter server processor), and a memory footprint cost $m_v$ (e.g., expressed in bytes) incurred during execution. Each edge (u, v)∈E has a bandwidth capacity $b_{uv}$ (e.g., expressed in bytes/sec) and object size cost $s_{uv}$ (e.g., expressed in bytes) in terms of the maximum number of bytes transferred between u and v in the interval between any two consecutive computations. (Note that in a continuous communication environment (e.g., data streams), $s_{uv}$ can be modeled as $b_{uv}*\tau$, where $\tau$ is a large constant.) Further, for applications that require or may benefit from storage of application state (e.g., for debugging, profiling) and intermediate results, a storage cost component per vertex can also be included. These costs can be measured off-line using profiling or learned in an on-line manner during the application execution. Profiling can include both peak and average loads.

The objective of the cloud application is to minimize the user-perceived latency and/or maximize throughput, and the energy consumption of executing the cloud application on the client. Note that other costs such as bandwidth (e.g., dollars per byte sent/received) between the client and server can be included in this framework. The tuning controls available for this optimization include placement of the application modules (also referred to as component) either on the client or on the middle/datacenter server, or some modules on the middle/datacenter server and some modules on the client.

In terms of source and sink and carrying forward the example of the user recording the multimedia object using the mobile device, a subset of the graph vertices can be pinned at the source (e.g., the image capture from a camera on the mobile client) or at the sink (the server). The client may also have a cached copy of a subset of the database stored locally (e.g., the database at the server hosted in the datacenter).

The optimization problem can be formalized as finding the optimal partitioning cut of the data flow graph (modules on one side of the cut reside on the client and modules on the other side of the cut reside on the server) to minimize a combined utility function of computation latency at the client and communication latency between the client and server, and energy consumed at the client in computing and sending/receiving data for the cloud application. A related variant of the problem is to minimize energy subject to one or more service level agreements (SLAs), for example, based on the response time (e.g., the total response latency should be at most 500 ms). The bandwidth of a given partitioning cut can be measured as the sum of the bandwidths of the edges in the cut. (The server can be assumed to have significantly higher computational power and smaller computation latency compared to the client.)

A graph partitioning that pins operators to the client or the server can be encoded using a set of indicator variables $\lambda_v \in \{0, 1\}$ for all v∈V, $$\lambda_v = \begin{cases} 1 & \text{if } v \text{ is assigned/pinned to client} \\ 0 & \text{otherwise} \end{cases}$$

The sum of computation costs of application components running at the client can be modeled as, $$cpu = \Sigma_v \lambda_v c_v \quad (1)$$

Similarly, the memory constraint as the total memory footprint to run application components locally at the client can be modeled to be below the client's available memory capacity M (e.g., in bytes) at that time:

$$mem \leq M, \text{ where } mem = \Sigma_v \lambda_v m_v \quad (2)$$

The bandwidth needed corresponding to the partitioning cut can be modeled as $\Sigma_{(u,v)\in E}|\lambda_u-\lambda_v|s_{uv}$, or alternatively as $$bw(\text{size in bytes}) = \Sigma_{(u,v)\in E}(\lambda_u-\lambda_v)^2 s_{uv} \quad (3)$$

The squared term $(\lambda_v-\lambda_v)^2$ evaluates to one when the (u, v) edge is cut and to zero, otherwise. Therefore, the two bandwidth expressions can be considered equivalent.

The processor, memory, and network costs can be combined into the following energy metric, $$E = \alpha cpu + \beta mem + \gamma bw \quad (4)$$

where $\alpha+\beta+\gamma=1$; $\alpha, \beta, \gamma \in [0, 1]$. Note that the weights $\alpha, \beta, \gamma$ are derived from profiling the power usage on the client (e.g., sending a single bit of data consumes 800-1000× more power than computing a single operation). In some client devices, when using wireless communications, (e.g., WiFi), the CPU and antenna may each consume about ⅓rd of the total power to transmit/receive bytes.

The model is additive (even if some modules run in parallel) because the resource usage of each module consumes energy.

Correspondingly, the end-to-end latency can be formulated as:

$$lat = \sum_v \frac{\lambda_v}{c_v} + \sum_{(u,v)\in E} (\lambda_u-\lambda_v)^2 \frac{s_{uv}}{b_{uv}} + \sum_v \frac{(1-\lambda_v)}{d_v} \quad (5)$$

The first latency term denotes the compute time (inverse of frequency) on the client, the second term denotes the transmission latency (object size/rate) to transfer data between modules hosted on the client and the server, and the third term denotes the compute time on servers in the datacenter.

The squared term in bandwidth and latency calculations can be converted to a linear term by introducing the following two variables per edge, $f_{uv} \geq 0 \forall(u, v) \in E$ and $g_{uv} \geq 0 \forall(u, v) \in E$ subject to the following constraints:

$$\forall(u,v)\in E\ f_{uv}+\lambda_u-\lambda_v \geq 0 \quad (6)$$

$$\forall(u,v)\in E\ g_{uv}+\lambda_v-\lambda_u \geq 0 \quad (7)$$

The intuition is to have $f_{uv}+g_{uv}$ equal to zero when edge (u, v) is not cut, and to one, otherwise. Thus, the network and latency can be re-formulated as:

$$bw(\text{size in bytes}) = \sum_{(u,v)\in E} (f_{uv}+g_{uv})s_{uv} \quad (8)$$

$$lat = \sum_v \frac{\lambda_v}{c_v} + \sum_{(u,v)\in E} (f_{uv}+g_{uv})\frac{s_{uv}}{b_{uv}} + \sum_v \frac{(1-\lambda_v)}{d_v} \quad (9)$$

The constraint on conserving the minimum battery life at the client (e.g., smartphones, netbooks, laptop) can be modeled as:

$$(\sigma_1)*\left(\sum_v \frac{\lambda_v}{d_v}\right) + (\sigma_2)*\left(\sum_{(u,v)\in E}(f_{uv}+g_{uv})\frac{s_{uv}}{b_{uv}}\right) + \quad (10)$$
$$(\sigma_3)*\left(\sum_v \frac{(1-\lambda_v)}{d_v}\right) \leq \text{Battery}^{left} - \text{Battery}^{MIN}$$

where $\sigma_1$ is a translation factor to convert computation time to battery usage on the client, $\sigma_2$ is a translation factor to convert bytes transmitted over a wired/wireless medium to battery usage on the client, the third term $$\sum_v \frac{(1-\lambda_v)}{d_v}$$

denotes the computation time on the datacenter side which is additive to the time spent on the client (the device should be running during this time but may be optionally switched to a low power mode waiting for results from the datacenter), $\sigma_3$ is a translation factor to denote battery usage per unit time at the client while waiting for results from the datacenter, Battery$^{left}$ is the battery life remaining in seconds, and Battery$^{MIN}$ is the minimum battery life in seconds. If the device is plugged-in to a recharging power supply, then Battery$^{left}$ can be set to ∞ (or a large constant, in implementation). In essence, this constraint calculates the amount of total battery life required to compute at the client, transfer the data, wait to receive the results from the datacenter, and receive the output result; the final output result sent from datacenter to the client will usually be of small size otherwise a correction term in the bandwidth part can be added in the above inequality. An advantage of this constraint is to extend the battery life at the client which could provide a competitive advantage of application providers.

The datacenter utilization can be modeled to address scenarios where the bulk of the computation load is offloaded to capable clients when the datacenter has a high utilization or is overloaded. The term Util denotes the estimated datacenter utilization based on prediction models in the next time window (e.g., five minutes).

$$U = \Sigma_v(1-\lambda_v)*(\eta_1*\text{Util}+\eta_2*e^{(\eta_3*Util)}) \quad (11)$$

The term U denotes the cost of running computations on the datacenter side as a function of current datacenter utilization. The function is a non-linear regression model (combination of linear exponential functions to model the fact that close to peak utilization, the optimal solution should run most computations at the client side). The constant parameters $\eta_1, \eta_2, \eta_3$ can all be set to one or determined empirically.

Figure 4:
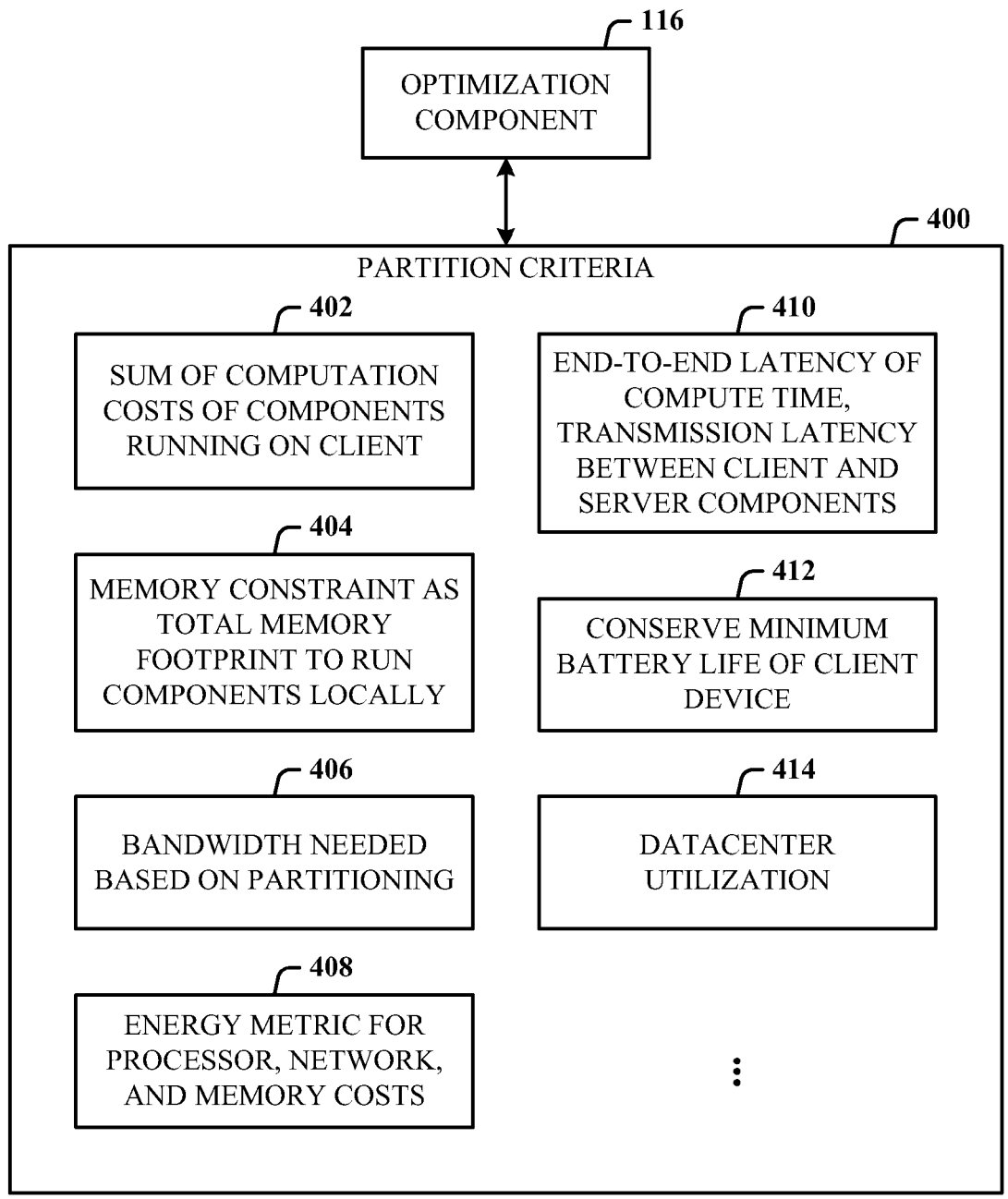
FIG. 4 illustrates partitioning criteria that can be determinative of where to pin components to process client workload.

FIG. 4 illustrates partitioning criteria 400 that can be determinative of where to pin components to process client workload. The optimal partitioning can be based on the sum of the computation costs of components running on the client device 402, memory footprint to run components locally (on the client device) 404, bandwidth needed based on the partitioning 406, an energy metric for processor, network, and memory costs 408, end-to-end latency as a function of compute time and transmission latency 410, conservation of minimum battery life of the client 412, and/or datacenter utilization (where the server is sited).

To express pinning of application components on the client and datacenter side, an additional variable $p_v$ is introduced, tagged with each vertex v. An advantage of pinning application components is to annotate components whose remote execution may not be supported. Specifically, $$p_v = \begin{cases} 0 & \text{if } v \text{ can only execute on the client side} \\ 1 & \text{otherwise} \end{cases}$$

More generally, components can be labeled as migratable, client side only, or server side only, for instance.

The corresponding constraint on $\lambda_v$ then becomes:

$$\forall v \in V, (1-\lambda_v) \le p_v \qquad (12)$$

Using the above formulations, the objective function can be defined as a mixed integer linear program (MILP) of minimizing the total latency and energy at the client.

$$\text{Objective: MIN } \delta_1 * \text{lat} + \delta_2 * E + (1-\delta_1-\delta_2) * U \qquad (13)$$

where $\delta_1, \delta_2 \in [0,1]$.

Thus, the MILP formulation expresses the optimization problem as a linear objective function with $4|E|+2|V|+2$ linear constraints and $2|E|+|V|$ variables; $|E|$ and $|V|$ denote the total number of edges and vertices, respectively. An optimal solution of the objective function (13) subject to (in)equalities (2), (4), and (6)-(10) described above is derived using a standard ILP (integer linear program) solver on the above formulation.

Two additional constraints for pinned source and sink vertices can be employed: $\lambda_{source}=1$ and $\lambda_{sink}=0$. In one implementation, the parameters can be set as follows: $\sigma_1=1, \sigma_2=10, \sigma_3=1$, Battery$^{MIN}$=5, $\delta_1=\delta_2=\frac{1}{3}$, $\eta_1=\eta_2=1$, $\eta_3=0.1$. Additionally, that Battery$^{left} \ge$ Battery$^{MIN}$ is checked before solving the optimization problem. Further, the bandwidth parameters $b_{uv}$ can be the same for each edge and equal to the bandwidth capacity between the client and the datacenter. Finally, the relationship between parameters $\alpha, \beta, \gamma$ can be set as:

$$\frac{\gamma}{\alpha} = \frac{\gamma}{\beta} = 1000.$$

In an alternative problem formulation, a related variant is to minimize the energy subject to an SLA on the response time (e.g., the total response latency $\tau \le 500$ ms), $$\text{Objective: MIN} \alpha cpu + \beta mem + \gamma bw \qquad (14)$$

subject to the previously described constraints and lat$\ge \tau$ where $$lat = \sum_v \frac{\lambda_v}{c_v} + \sum_{(u,v) \in E} (f_{uv}+g_{uv}) \frac{s_{uv}}{b_{uv}} + \sum_v \frac{(1-\lambda_v)}{d_v} \qquad (15)$$

The disclosed optimization architecture optimizes for user latency and energy, whereas existing work focuses only on either throughput or latency. Moreover, memory footprint of processing modules is considered, in contrast to prior work. Additionally, the disclosed graph model supports general back-and-forth communications between client and server, whereas existing approaches consider a directed graph model where paths may cross the client-server boundary once. Finally, the disclosed architecture finds applicability to mobile clients that typically are associated with diverse devices, capabilities, and network connectivity, and performs dynamic partitioning of application execution based on different factors such as instrumentation data, current load, resource footprint of different components and, connectivity and capabilities.

The disclosed formulation includes assumptions that assume the data flow graph is a connected graph with no partitions or cycles, and the memory footprint of different processing modules is considered additive to compute the total memory usage. However, the modules may be scheduled at different times so the maximum memory footprint across modules may be more appropriate as the usage metric. Additionally, it is assumed that the client utilizes a single CPU processor and do not consider effects on memory contention and latency between hosted modules running on multiple cores. In particular, in a fork join model where multiple modules can be scheduled in parallel on multi-cores, the computation latency will be governed by the slowest vertex (max(1/$c_v$)), correspondingly, the diameter of the graph, while the memory footprint and bandwidth will remain additive. Finally, multiple tier-splitting partitions are not considered, but can be include in the formulation as desired.

One implementation of the disclosed architecture describes the cloud application as a workflow by using WCF (Windows Communication Foundation) in which each activity can be a DSS (decentralized software services) service which can be either placed in the local address space or in the remote datacenter. Using the above described optimization framework, the best splitting layout can be computed for this workflow (assuming the workflow is a DAG (directed acyclic graph)), and then run the workflow to balance the application performance-energy usage tradeoffs.

Another implementation of the disclosed architecture is to describe the cloud application as an application call graph where each component runs in a managed code environment, for example, using the Microsoft .NET Common Language Runtime (CLR).

As previously described, an optimization supports caching of a small-scale database of features, application state, intermediate results, and information about of objects of interest on the client to improve throughput and responsiveness. The inputs can include, but are not limited to, processing time and memory footprint of each module on the client, object size that needs to be transmitted from one module to another (the latter hosted in the datacenter), bandwidth capacity and latency between the client and the datacenter, available battery life of the client, and ratio of how much power is consumed in computation versus data transmission/reception at the client (e.g., mobile).

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
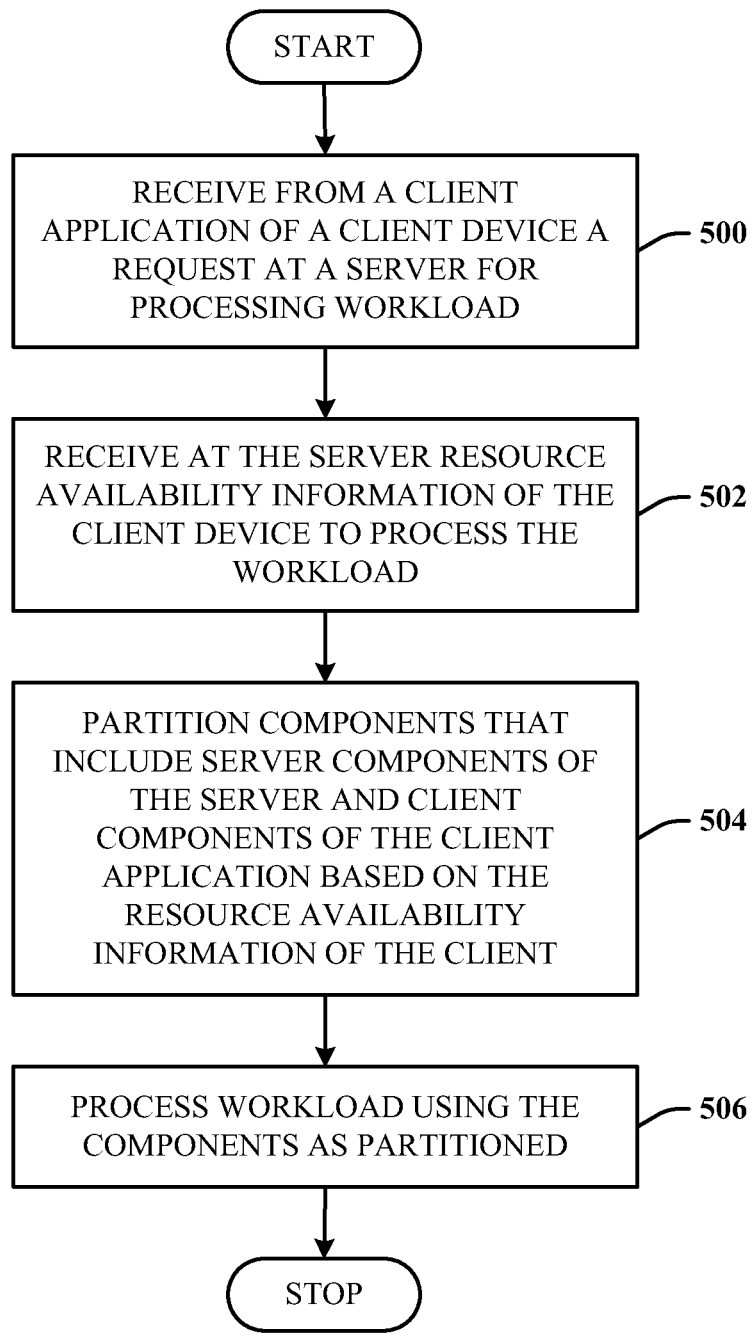
FIG. 5 illustrates a computer-implemented optimization method in accordance with the disclosed architecture.

FIG. 5 illustrates a computer-implemented optimization method in accordance with the disclosed architecture. At 500, a request is received at a server from a client application of a client device for processing workload. At 502, resource availability information of the client device is received at the server to process the workload. At 504, components that include server components of the server and client components of the client application are partitioned based on the resource availability information of the client. At 506, the workload is processed using the components as partitioned.

Figure 6:
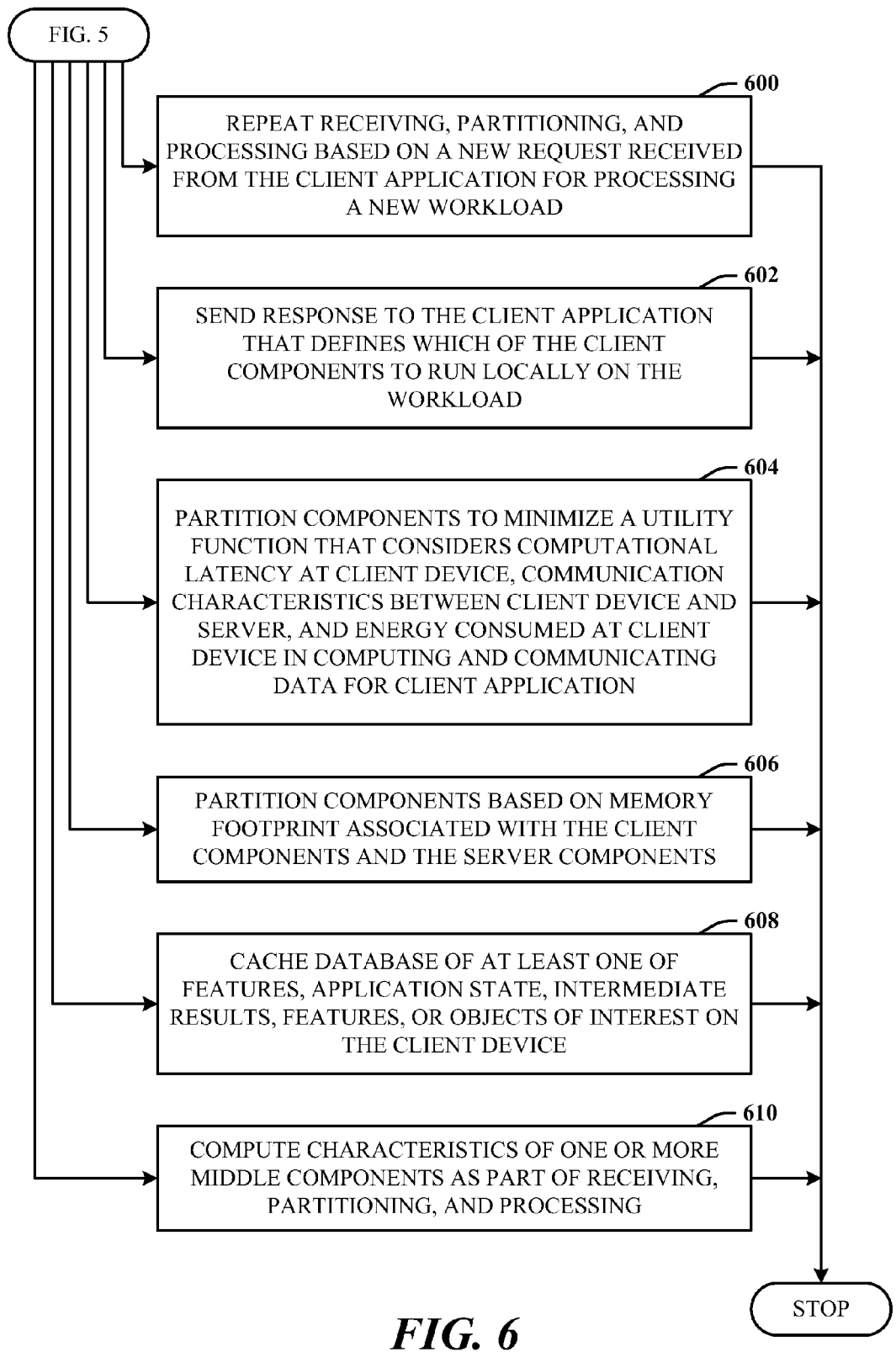
FIG. 6 illustrates further aspects of the method of FIG. 5.

FIG. 6 illustrates further aspects of the method of FIG. 5. Note that the arrowing indicates that each block represents a step that can be included, separately or in combination with other blocks, as additional aspects of the method represented by the flow chart of FIG. 5. At 600, repeat receiving, partitioning, and processing based on a new request received from the client application for processing a new workload. At 602, a response is sent to the client application that defines which of the client components to run locally on the workload. At 604, the components are partitioned to minimize a utility function that considers computational latency at the client device, communication characteristics (e.g., bandwidth, packet loss rate, link error rate, jitter, latency) between the client device and the server, and energy consumed at the client device in computing and communicating data for the client application. At 606, the components are partitioned based on memory footprint associated with the client components and the server components. At 608, a database of features, application state, intermediate results, and objects of interest is cached on the client device. At 610, characteristics of one or more middle components are computed as part of receiving, partitioning, and processing. In a further embodiment, the optimal partitioning between client and server components may be based on caching at the client.

Figure 7:
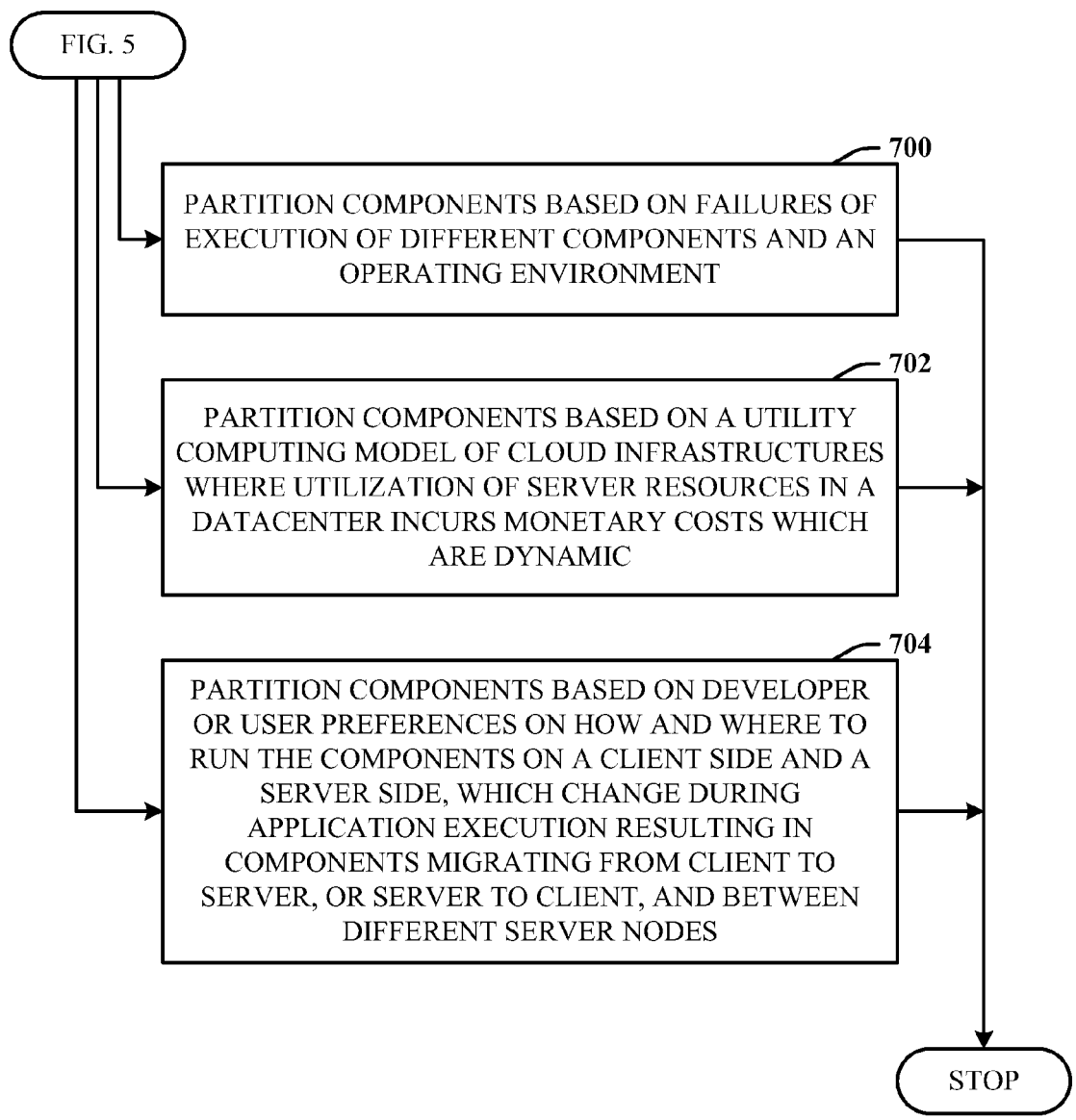
FIG. 7 illustrates further aspects of the method of FIG. 5.

FIG. 7 illustrates further aspects of the method of FIG. 5. Note that the arrowing indicates that each block represents a step that can be included, separately or in combination with other blocks, as additional aspects of the method represented by the flow chart of FIG. 5. At 700, the components are partitioned based on failures of execution of different components and an operating environment. At 702, the components are partitioned based on a utility computing model of cloud infrastructures where utilization of server resources in a datacenter incurs monetary costs which are dynamic. At 704, the components are partitioned based on developer or user preferences on how and where to run the components on a client side and a server side, which change during application execution resulting in components migrating from client to server, or server to client, and between different server nodes.

Figure 8:
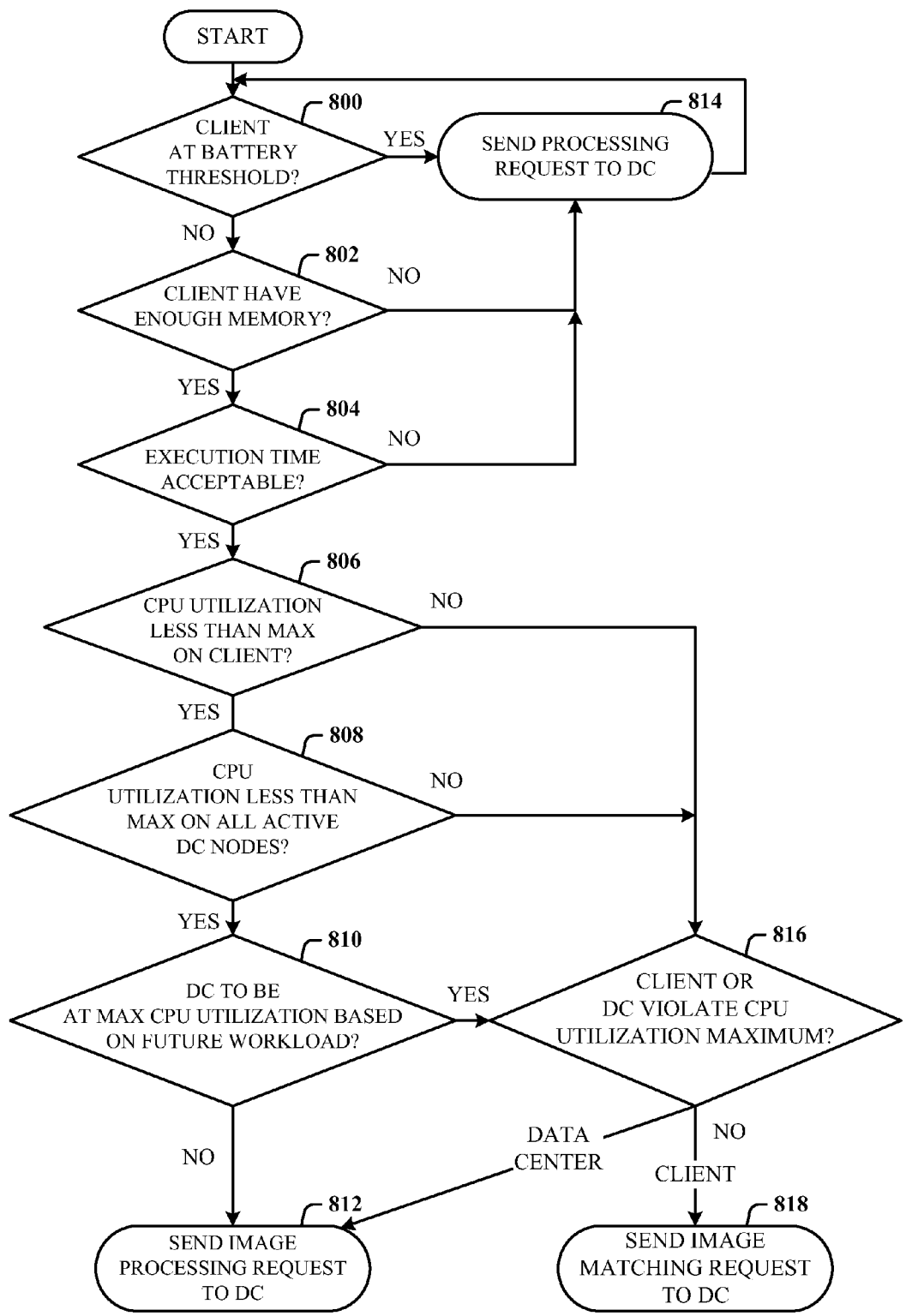
FIG. 8 illustrates a method of partitioning application components based on client power consumption.

FIG. 8 illustrates a method of partitioning application components based on client power consumption. This example continues with the image processing of the mobile client previously described. At 800, a check is made to determine if the client battery threshold has been exceeded, that is, has the client device battery power dropped below a minimum battery life. If not, at 802, a check is made to determine if the client device has sufficient memory for the workload. If so, flow is to 804 to determine if the execution time at the client is within acceptable parameters. At 806, a check is made to determine if CPU utilization at the client is less than a maximum. If so, flow is to 810 determine if the datacenter (DC) will be at maximum processor utilization based on future workload. If not, flow is to 812 to send an image processing request to the datacenter. Thereafter, optimized partitioning is performed on the components to perform the image processing.

Returning to 800, if the client battery threshold has been met or exceeded, a processing request is sent to the datacenter to offload the processing to the datacenter. At 802, if the client does not have sufficient memory, flow is to 814. Similarly, at 804, if the execution is not acceptable, flow is to 814. At 806, if CPU utilization is not at the maximum, flow is to 816 to check if the client or the datacenter violate a CPU utilization maximum. This flow occurs as well from 808, if the CPU utilization is not less than a maximum on all the datacenter nodes, and from 810, if the datacenter will be at maximum CPU utilization based on future workload. In all cases where flow is to 816, if the datacenter does not violate the CPU maximum utilization, flow is to 812 to send the image processing request to the datacenter, or if the client does not violate the CPU maximum utilization, flow is to 818 to send the image matching request to the datacenter.

In an alternative situation, it is possible that the client device or system may interact with multiple different datacenters, in which case, client resources may be utilized in different ways depending on workload completion between the datacenters and the client applications.

In yet other embodiments, there can be a middle or intermediary system via which the client application operates to the cloud. For example, a wireless handset or cell phone communicates to a base station. From the base station, when making a phone call, the connection is made over the regular landline connection to the PSTN (public-switch telephone network). Thus, partitioning can be performed between the handset (e.g., cell phone) and the base station. (It is within contemplation that communications can be through a cable network using an interface box.)

In an extension, in many cases the middle system exists at the communications site (the base station system). Thus, optimization processing can be performed between the base station system and the client device. This implementation offers benefits obtained via the client/server model described herein, by reducing latency, for example, since the middle system is closer to the client and also reduces the load on the datacenter.

In a further extension, the middle system can exist as a middle server (e.g., connected to an edge router in the Internet) or as a server located at the point-of-presence (PoP) location of an Internet service provider (ISP).

In yet another embodiment, the optimal partitioning may be based on speculative execution of server-side components and buffering the externally-visible output in terms of screen, communication, and storage at the client until the output of server-side computation is received.

In an alternative embodiment, a software clone of the physical client device may be hosted in the client on a powerful resource-rich server in, for example, the datacenter, which may perform computations and storage on behalf of or in collaboration with the physical client device and may communicate with the client device as needed.

In another embodiment, the optimal partitioning may consider the trade-offs between communication latency, precision, and battery consumption. For instance, coarse-grained results can be initially provided to the client, which can then be incrementally refined to provide higher accuracy at the cost of increased latency and higher resource usage.

In another extension, the optimal partitioning may take into consideration failures of execution of different components and the operating environment (e.g., network connectivity).

Further, the optimal partitioning may be based on the utility computing (i.e., pay-as-you-go and on-demand resources) model of cloud infrastructures where utilizing server resources in the datacenter incurs monetary costs which further may be dependent on time, location, type of computation, bandwidth pricing, among other factors.

In another embodiment, the partitioning may include developer or user preferences on how and where to run the components on the client side and the server side. Further, these preferences may change during application execution resulting in components migrating from client to server or vice versa, and even between different server nodes. This scenario will also be applicable to running application between public and private clouds.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

It is to be understood that the optimization components can be employed in combination with clients on various types of devices and systems. Following is a description that includes a computer and a mobile device both of which can employ applications that benefit from the optimization architecture.

Figure 9:
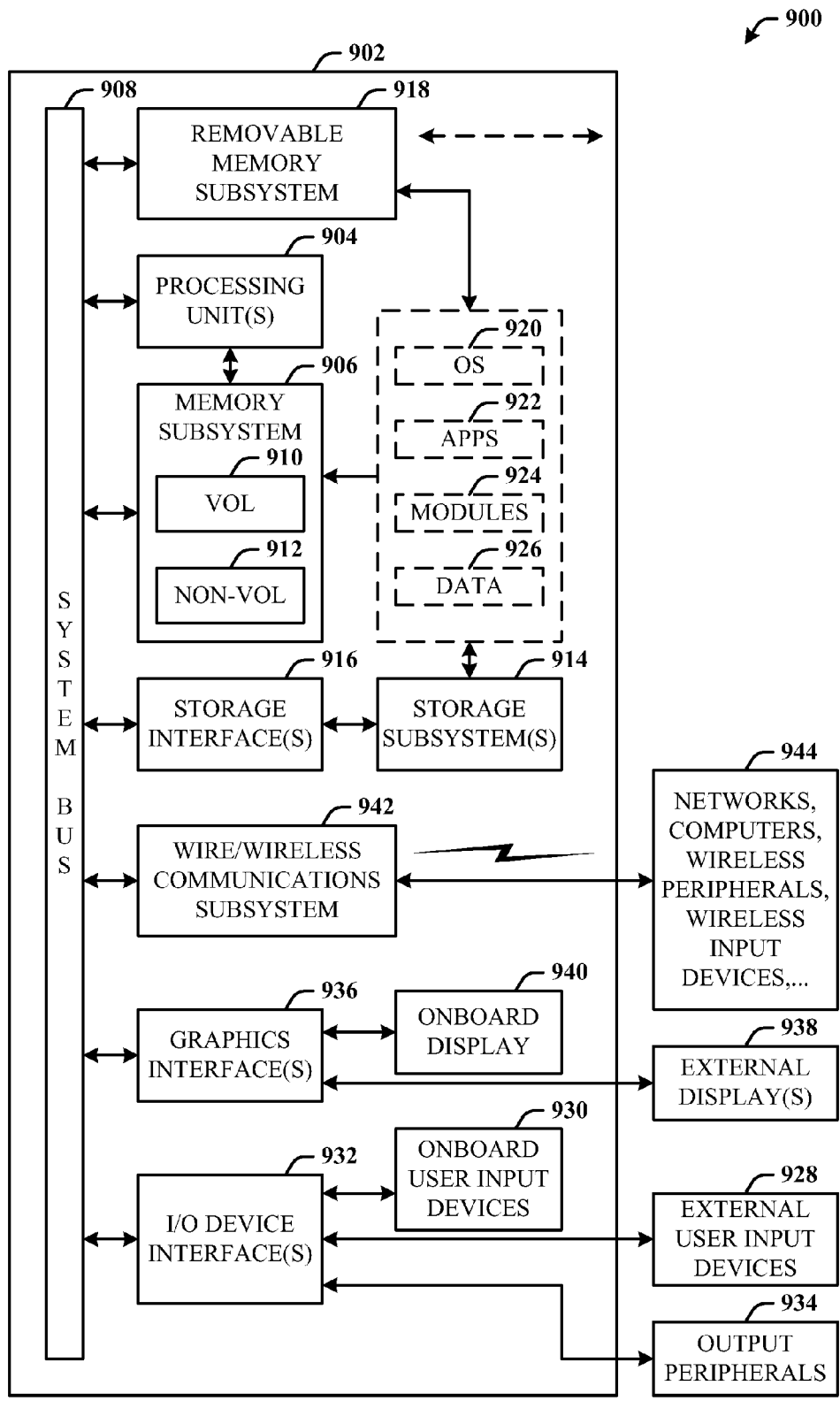
FIG. 9 illustrates a block diagram of a computing system that executes optimized partitioning in accordance with the disclosed architecture.

Referring now to FIG. 9, there is illustrated a block diagram of a computing system 900 that executes optimized partitioning in accordance with the disclosed architecture. In order to provide additional context for various aspects thereof, FIG. 9 and the following description are intended to provide a brief, general description of the suitable computing system 900 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 900 for implementing various aspects includes the computer 902 having processing unit(s) 904, a computer-readable storage such as a system memory 906, and a system bus 908. The processing unit(s) 904 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 906 can include computer-readable storage (physical storage media) such as a volatile (VOL) memory 910 (e.g., random access memory (RAM)) and non-volatile memory (NON-VOL) 912 (e.g., ROM, EPROM, EEPROM, etc.). A basic input/output system (BIOS) can be stored in the non-volatile memory 912, and includes the basic routines that facilitate the communication of data and signals between components within the computer 902, such as during startup. The volatile memory 910 can also include a high-speed RAM such as static RAM for caching data.

The system bus 908 provides an interface for system components including, but not limited to, the system memory 906 to the processing unit(s) 904. The system bus 908 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 902 further includes machine readable storage subsystem(s) 914 and storage interface(s) 916 for interfacing the storage subsystem(s) 914 to the system bus 908 and other desired computer components. The storage subsystem(s) 914 (physical storage media) can include one or more of a hard disk drive (HDD), a magnetic floppy disk drive (FDD), and/or optical disk storage drive (e.g., a CD-ROM drive DVD drive), for example. The storage interface(s) 916 can include interface technologies such as EIDE, ATA, SATA, and IEEE 1394, for example.

One or more programs and data can be stored in the memory subsystem 906, a machine readable and removable memory subsystem 918 (e.g., flash drive form factor technology), and/or the storage subsystem(s) 914 (e.g., optical, magnetic, solid state), including an operating system 920, one or more application programs 922, other program modules 924, and program data 926.

The one or more application programs 922, other program modules 924, and program data 926 can include the entities and components of the system 100 of FIG. 1, the entities and components of the system 200 of FIG. 2, the application model 300 of FIG. 3, the partitioning criteria 400 of FIG. 4, and the methods represented by the flowcharts of FIGS. 5-8, for example.

Generally, programs include routines, methods, data structures, other software components, etc., that perform particular tasks or implement particular abstract data types. All or portions of the operating system 920, applications 922, modules 924, and/or data 926 can also be cached in memory such as the volatile memory 910, for example. It is to be appreciated that the disclosed architecture can be implemented with various commercially available operating systems or combinations of operating systems (e.g., as virtual machines).

The storage subsystem(s) 914 and memory subsystems (906 and 918) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 902 and includes volatile and non-volatile internal and/or external media that is removable or non-removable. For the computer 902, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 902, programs, and data using external user input devices 928 such as a keyboard and a mouse. Other external user input devices 928 can include a microphone, an IR (infrared) remote control, a joystick, a game pad, camera recognition systems, a stylus pen, touch screen, gesture systems (e.g., eye movement, head movement, etc.), and/or the like. The user can interact with the computer 902, programs, and data using onboard user input devices 930 such a touchpad, microphone, keyboard, etc., where the computer 902 is a portable computer, for example. These and other input devices are connected to the processing unit(s) 904 through input/output (I/O) device interface(s) 932 via the system bus 908, but can be connected by other interfaces such as a parallel port, IEEE 1394 serial port, a game port, a USB port, an IR interface, etc. The I/O device interface(s) 932 also facilitate the use of output peripherals 934 such as printers, audio devices, camera devices, and so on, such as a sound card and/or onboard audio processing capability.

One or more graphics interface(s) 936 (also commonly referred to as a graphics processing unit (GPU)) provide graphics and video signals between the computer 902 and external display(s) 938 (e.g., LCD, plasma) and/or onboard displays 940 (e.g., for portable computer). The graphics interface(s) 936 can also be manufactured as part of the computer system board.

The computer 902 can operate in a networked environment (e.g., IP-based) using logical connections via a wired/wireless communications subsystem 942 to one or more networks and/or other computers. The other computers can include workstations, servers, routers, personal computers, microprocessor-based entertainment appliances, peer devices or other common network nodes, and typically include many or all of the elements described relative to the computer 902. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 902 connects to the network via a wired/wireless communication subsystem 942 (e.g., a network interface adapter, onboard transceiver subsystem, etc.) to communicate with wired/wireless networks, wired/wireless printers, wired/wireless input devices 944, and so on. The computer 902 can include a modem or other means for establishing communications over the network. In a networked environment, programs and data relative to the computer 902 can be stored in the remote memory/storage device, as is associated with a distributed system. It will be appreciated that the network connections shown are exemplary and other means of establishing a communications link between the computers can be used.

The computer 902 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated and described aspects can be practiced in distributed computing environments where certain tasks are performed by remote processing devices that are linked through a communications network. In a distributed computing environment, program modules can be located in local and/or remote storage and/or memory system.

Figure 10:
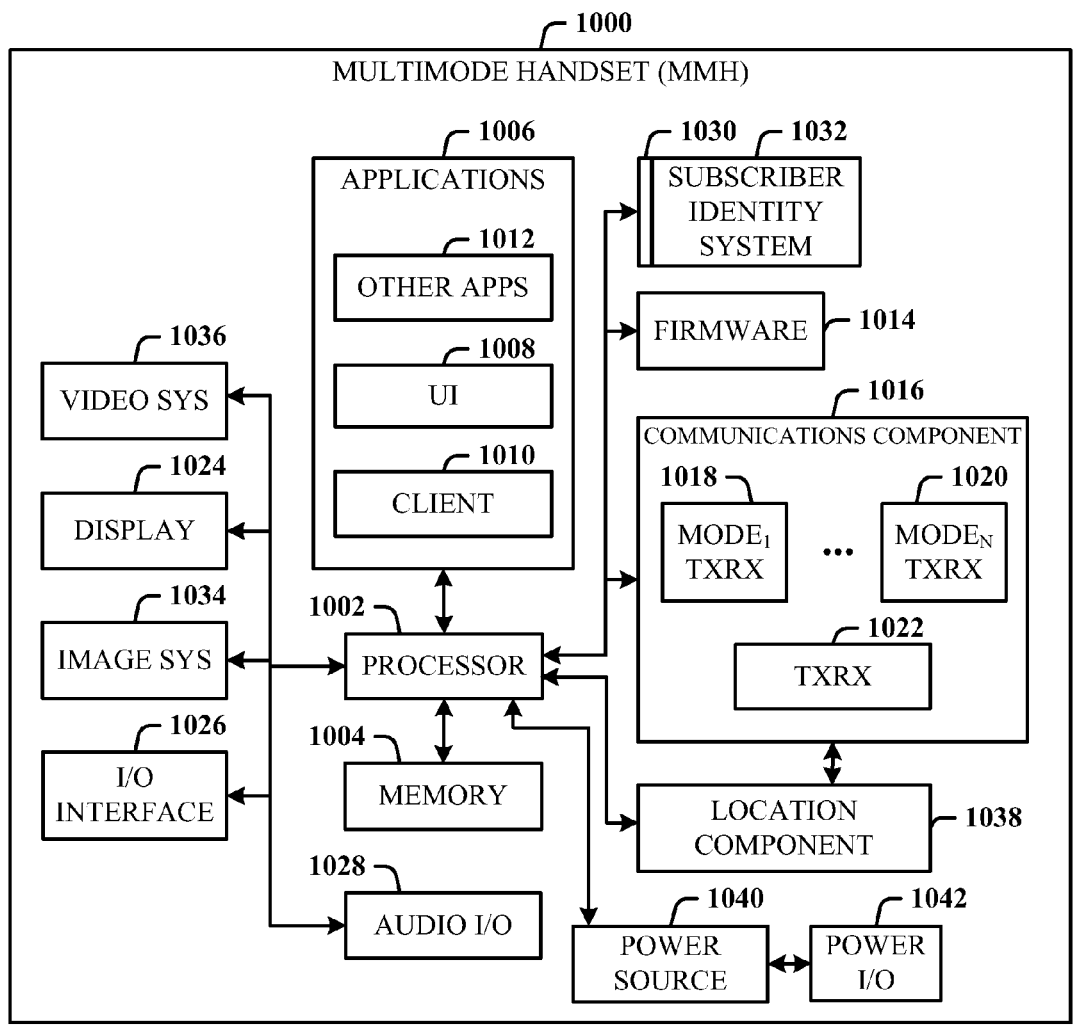
FIG. 10 illustrates a schematic block diagram of an exemplary multimode handset that can perform optimization processing in accordance with the disclosed architecture.

FIG. 10 illustrates a schematic block diagram of an exemplary multimode handset 1000 that can perform optimization processing in accordance with the disclosed architecture. In order to provide additional context for various aspects thereof, FIG. 10 and the following discussion are intended to provide a brief, general description of a suitable environment in which the various aspects of the innovation can be implemented. While the description includes a general context of computer-executable instructions, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the inventive methods can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

The handset 1000 (e.g., a cell phone) can typically include a variety of computer readable media. Computer readable media can be any available media accessed by the handset systems and includes volatile and non-volatile media, removable and non-removable media. By way of example, and not limitation, computer-readable media can comprise device storage media and communication media. Storage media includes volatile and/or non-volatile, removable and/or non-removable media implemented in any method or technology for the storage of information such as computer-readable instructions, data structures, program modules or other data. Storage media can include, but is not limited to, RAM, ROM, EEPROM, flash memory or other memory technology, CDROM, digital video disc (DVD) or other optical disk storage, magnetic tape, magnetic disk storage or other magnetic storage devices, or any other medium which can be used to store the desired information and which can be accessed by the handset systems.

Although described relative to a handset, some or all of the components and entities can be employed separately in a base station for the handset 1000.

The handset 1000 includes a processor 1002 for controlling and processing onboard operations and functions. A memory 1004 interfaces to the processor 1002 for the storage of data and one or more applications 1006 (e.g., a video player software, user feedback component software, etc.). The applications 1006 can also include a user interface (UI) application 1008 that operates with a client 1010 (e.g., operating system) to facilitate user interaction with handset functionality and data, for example, answering/initiating calls, entering/deleting data, configuring settings, address book manipulation, multimode interaction, etc. The applications 1006 can include other applications 1012 that came installed with the handset 1006 and/or can be installed as add-ons or plug-ins to the client 1010 and/or UI 1008, for example, or for other purposes (e.g., processor, firmware, etc.).

The other applications 1012 can include voice recognition of predetermined voice commands that facilitate user control, call voice processing, voice recording, messaging, e-mail processing, video processing, image processing, music play, as well as subsystems or components described infra. Some of the applications 1006 can be stored in the memory 1004 and/or in a firmware 1014, and executed by the processor 1002 from either or both the memory 1004 or/and the firmware 1014. The firmware 1014 can also store code for execution in power-up initialization and control during normal operation of the handset 1000.

A communications component 1016 can interface to the processor 1002 to facilitate wired/wireless communications with external systems, for example, cellular networks, VoIP (voice-over-IP) networks, local wireless networks or personal wireless networks such as Wi-Fi, Wi-Max, and so on. Here, the communications component 1016 can also include a multimode communications subsystem for providing cellular communications via different cellular technologies. For example, a first cellular transceiver 1018 (e.g., GSM) can be one mode and an Nth transceiver 1020 can provide cellular communications via an Nth cellular network (e.g., UMTS), where N is a positive integer. The communications component 1016 can also include a transceiver 1022 for unlicensed communications (e.g., Wi-Fi, Wi-Max, Bluetooth, etc.) for corresponding communications. The communications component 1016 can also facilitate communications reception from terrestrial radio networks (e.g., broadcast), digital satellite radio networks, and Internet-based radio services networks.

The handset 1000 can process IP data traffic via the communications component 1016 to accommodate IP traffic from an IP network such as, for example, the Internet, a corporate intranet, a home broadband network, a personal area network, etc., via an ISP or broadband cable provider. Thus, VoIP traffic can be utilized by the handset 1000 and IP-based multimedia content can be received in an encoded and/or decoded format.

The handset 1000 includes a display 1024 for displaying multimedia that include text, images, video, telephony functions (e.g., a Caller ID function), setup functions, menus, etc. The display 1024 can also accommodate the presentation of multimedia content (e.g., music metadata, messages, wallpaper, graphics, etc.).

An input/output (I/O) interface 1026 can be provided for serial/parallel I/O of data and/or signals (e.g., USB, and/or IEEE 1394) via a hardwire connection, and other I/O devices (e.g., a keyboard, keypad, mouse, interface tether, stylus pen, touch screen, etc.). The I/O interface 1026 can be utilized for updating and/or troubleshooting the handset 1000, for example.

Audio capabilities can be provided via an audio I/O component 1028, which can include a speaker for the output of audio signals related to, for example, indication that the user pressed the proper key or key combination to initiate the user feedback signal, call signals, music, etc. The audio I/O component 1028 also facilitates the input of audio signals via a microphone to record data and/or telephony voice data, and for inputting voice signals for telephone conversations.

The handset 1000 can include a slot interface 1030 for accommodating a subscriber identity system 1032 that can accommodate a SIM or universal SIM (USIM), and interfacing the subscriber identity system 1032 with the processor 1002. However, it is to be appreciated that the subscriber identity system 1032 can be manufactured into the handset 1000, and updated by downloading data and software thereinto.

An image capture and processing system 1034 (e.g., a camera) can be provided for decoding encoded image content. Additionally, as indicated, photos can be obtained via an associated image capture subsystem of the image system 1034. The handset 1000 can also include a video component 1036 for processing video content received and, for recording and transmitting video content.

Optionally, a geolocation component 1038 (e.g., GPS-global positioning system) facilitates receiving geolocation signals (e.g., from satellites via the communications component 1016) that define the location of the handset 1000. Alternatively, or in combination therewith, the geolocation component 1038 can facilitate triangulation processing for locating the handset 1000.

The handset 1000 also includes a power source 1040 in the form of batteries and/or an AC power subsystem, which power source 1040 can interface to an external power system or charging equipment (not shown) via a power I/O component 1042.

Figure 11:
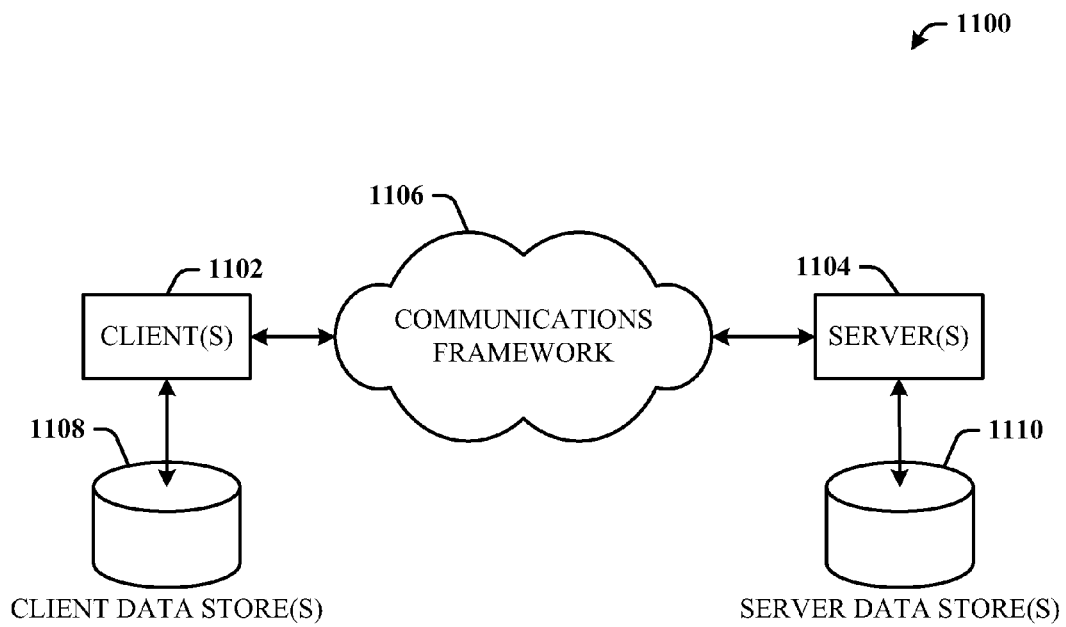
FIG. 11 illustrates a schematic block diagram of a computing environment that utilizes optimized partitioning in accordance with the disclosed architecture.

Referring now to FIG. 11, there is illustrated a schematic block diagram of a computing environment 1100 that utilizes optimized partitioning in accordance with the disclosed architecture. The environment 1100 includes one or more client(s) 1102. The client(s) 1102 can be hardware and/or software (e.g., threads, processes, computing devices). The client(s) 1102 can house cookie(s) and/or associated contextual information, for example.

The environment 1100 also includes one or more server(s) 1104. The server(s) 1104 can also be hardware and/or software (e.g., threads, processes, computing devices). The servers 1104 can house threads to perform transformations by employing the architecture, for example. One possible communication between a client 1102 and a server 1104 can be in the form of a data packet adapted to be transmitted between two or more computer processes. The data packet may include a cookie and/or associated contextual information, for example. The environment 1100 includes a communication framework 1106 (e.g., a global communication network such as the Internet) that can be employed to facilitate communications between the client(s) 1102 and the server(s) 1104.

Communications can be facilitated via a wire (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented optimization system having computer readable media that store executable instructions executed by a processor, comprising:

a cloud application that comprises client components of a client device and server components of a server configured to process workload;

a request component configured to receive a request from the cloud application to process portions of the workload via the client components and the server components, the request includes client resource information of available client resources to process the workload;

an optimization component that models dynamic application partitioning between the client device and the server by obtaining current values of client-specific parameters of the client resource information and computing an optimal dynamic partitioning of the client and server components to process the workload between the client device and the server based on the client-specific parameters of the client resource information; and a microprocessor that executes computer-executable instructions associated with at least one of the request component or the optimization component.

2. The system of claim 1, wherein the optimal partitioning is based on at least one of energy consumption of the client device, resource footprint of the client device, data dependencies, network connectivity, or service level agreement.

3. The system of claim 1, wherein the optimal partitioning is performed on a per-request basis.

4. The system of claim 1, wherein the optimization component sends a response to the cloud application that defines which client components to run locally against the workload.

5. The system of claim 1, wherein the cloud application is a client application modeled as a directed data flow graph of vertices as processing modules and edges as communication links, the graph having associated costs where each vertex has an associated computation cost, storage cost, and memory footprint cost, and each edge has an associated bandwidth capacity cost and object size cost.

6. The system of claim 5, wherein the costs are measured offline using profiling.

7. The system of claim 5, wherein the costs are learned online during execution of the client application and the server application.

8. The system of claim 1, wherein the optimal partitioning is based on at least one of computation and storage costs of components running on the client device, memory footprint to run components on the client device, bandwidth needed based on the partitioning, data dependencies, power usage by the client device, end-to-end latency as a function of compute time and transmission latency, conservation of minimum battery life of client, or datacenter utilization where the server is sited.

9. The system of claim 1, wherein the optimization component pushes one or more components to the client device to run against the workload.

10. A computer-implemented optimization system having computer readable media that store executable instructions executed by a processor, comprising:

a request component that receives a request from a cloud application to process workload, the cloud application comprises client components of a client and server components of a server for processing the workload;

an optimization component that models dynamic partitioning of the cloud application by obtaining current values of client-specific parameters of the client components and the server components and computing an optimal dynamic partitioning of the client components and server components to process the workload between the client and the server based on the client-specific parameters, client resources and server resources, and sends a response to the client that defines which client components to run locally against the workload; and a microprocessor that executes computer-executable instructions associated with at least one of the request component or the optimization component.

11. The system of claim 10, wherein the optimal partitioning is based on at least one of energy consumption of the client, resource footprint of the client, network connectivity, security and privacy data, computation concerns, or service level agreement.

12. The system of claim 10, wherein the optimal partitioning is based on speculative execution of server-side components and buffering externally-visible output at the client until output of server-side computation is received.

13. The system of claim 10, wherein the optimal partitioning is based on a middle system between the client and a datacenter.

14. The system of claim 10, where the optimal partitioning is based on a software clone of a physical client device may be hosted in the client on a powerful server which may perform computations and storage on behalf of or in collaboration with the physical client device and may communicate with the client device as needed.

15. The system of claim 10, where the optimal partitioning considers trade-offs between communication latency, precision, and battery consumption.

16. The system of claim 10, wherein the optimal partitioning is based on at least one of computation costs of components running on the client device, memory footprint to run components on the client device, bandwidth needed based on the partitioning, power usage by the client device, end-to-end latency as a function of compute time and transmission latency, data dependencies, conservation of minimum battery life of the client, or datacenter utilization where the server is sited.

17. The system of claim 10, wherein the cloud application is modeled to include computation and storage costs associated with processor resources of the client, a computation cost associated with processor resources of the server, a memory footprint cost incurred during execution, a bandwidth capacity cost between the client and the server, and an object size cost of data transferred between the client and the server during computations.

18. The system of claim 17, wherein the costs are measured offline using profiling or learned online during execution of the client and the server.

19. A computer-implemented optimization method performed by a computer system executing machine-readable instructions, the method, comprising acts of:

receiving from a cloud application a request for processing workload via a client device and a server;

receiving client resource availability information of the client device and server resource availability information of the server to process the workload;

modeling dynamic application partitioning of the cloud application between the client device and the server by obtaining current values of parameters of the respective client and server resource availability information and computing an optimal dynamic partitioning of the cloud application;

partitioning the computation of components of the cloud application that include server components of the server and client components of the client device between the client device and the server based on the current values of the parameters of the respective client and server resource availability information; and processing the workload using the components as partitioned.

20. The method of claim 19, further comprising repeating receiving, partitioning, and processing based on a new request received from the client device for processing a new workload.

21. The method of claim 19, further comprising sending a response to the client device that defines which of the client components to run locally on the workload.

22. The method of claim 19, further comprising partitioning the components to minimize a utility function that considers computational latency at the client device, communication latency between the client device and the server, and energy consumed at the client device in computing and communicating data for the client application.

23. The method of claim 19, further comprising partitioning the components based on memory footprint associated with the client components and the server components.

24. The method of claim 19, further comprising caching a database of at least one of application state, intermediate results, features, or objects of interest on the client device and on a datacenter side.

25. The method of claim 19, further comprising computing characteristics of one or more middle components as part of receiving, partitioning, and processing.

26. The method of claim 19, further comprising partitioning the components based on failures of execution of different components and an operating environment.

27. The method of claim 19, further comprising partitioning the components based on a utility computing model of cloud infrastructures where utilization of server resources in a datacenter incurs monetary costs which are dynamic.

28. The method of claim 19, further comprising partitioning the components based on developer or user preferences on how and where to run the components on a client side and a server side, which change during application execution resulting in components migrating from client to server, or server to client, and between different server nodes.

* * * * *